Aug. 15, 1950  P. C. SYMMONS  2,519,158
MIXING VALVE AND DIVERTER
Filed May 23, 1947  2 Sheets-Sheet 1
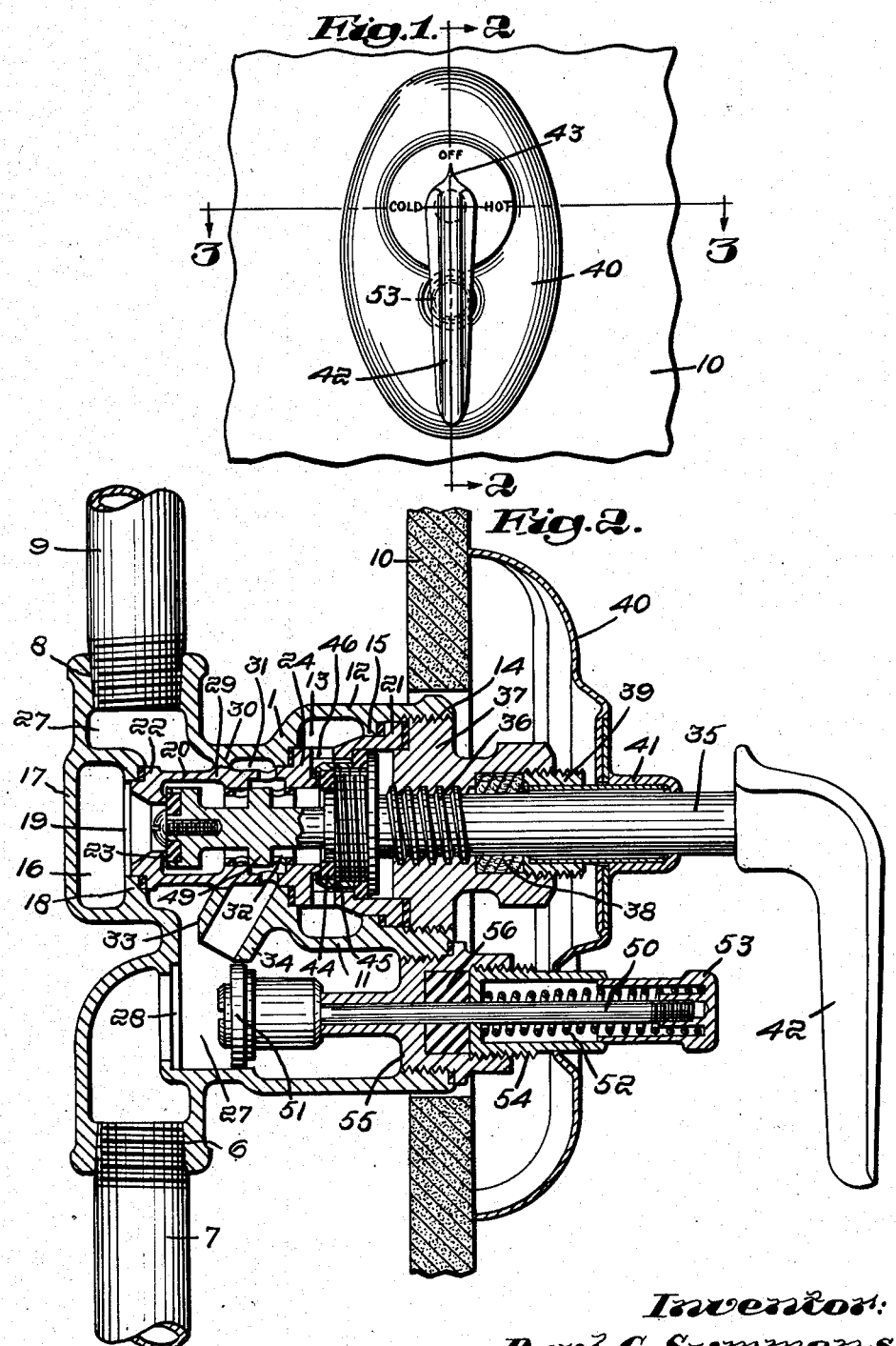
Inventor:
Paul C. Symmons:
by Heard Smith & Tennant
Attorneys

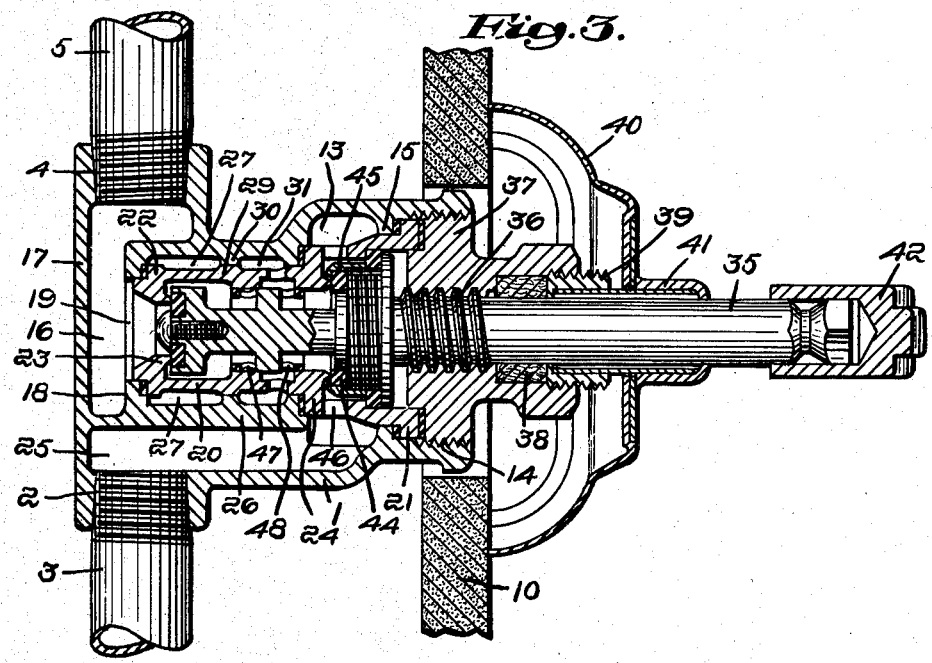

Patented Aug. 15, 1950

2,519,158

UNITED STATES PATENT OFFICE 2,519,158

MIXING VALVE AND DIVERTER

Paul C. Symmons, West Roxbury, Mass.

Application May 23, 1947, Serial No. 750,087

3 Claims. (Cl. 277—18)

This invention relates to a mixing valve for mixing fluids under the same or relatively different pressures and of different temperatures to cause the delivery through either of two outlets, as selected, of a mixture of the fluids at a desired and uniform intermediate temperature. More particularly the valve is intended for the delivery of a mixture of hot and cold water under the same or different pressures either to a bath tub or to a shower and so as to insure the total delivery of the mixture to either as selected.

The invention has for its object to provide a compact type of valve enclosing in a single casing the main valve and the diverter for selecting the outlet for the discharge of the mixture.

The invention has for its further object to provide such a valve in which the mixture is discharged into a chamber opening to both outlets through a chute directed toward one of the outlets and in which a diverter valve is combined with the said outlet.

The invention has for its further object to provide such a valve so having a chute and diverter valve in which the diverter valve, when in open position, co-operates with the chute to insure the discharge of the mixture through the outlet toward which the chute is directed.

These and other objects and features of the invention will appear more fully from the accompanying description and drawings and will be particularly pointed out in the claims.

The drawings illustrate a preferred form of the invention as designed for delivering a mixture of hot and cold water at a required intermediate temperature either vertically downward as to a bath tub or vertically upward as to a shower. The valve is a self-contained piece of apparatus and may be made of the usual materials employed for such valves. It is designed to be supported by the pipes through which the water is supplied and the mixture discharged and preferably to extend through a partition wall with the outer end covered by a suitable cover plate.

In the drawings:

Fig. 1 is a face view of a portion of the partition wall with the valve in place;

Fig. 2 is a view, principally in vertical cross section, taken through the line 2—2 of Fig. 1 and through the entire valve; and, Fig. 3 is a view, principally in transverse central cross section, of the construction shown in Fig. 2.

The valve comprises a casing 1, preferably cast from a suitable metal, having an inlet 2 into which is threaded the pipe 3 for cold water, an inlet 4 into which is threaded a pipe 5 for hot water, an outlet 6 into which a pipe 7 is threaded for discharge as into a bath tub, and an outlet 8 into which a pipe 9 is threaded for discharge as to a shower. In the preferred form illustrated the pipes 7 and 9 are in vertical alinement with the pipe 7 directed downward and the pipe 9 upward, and the pipes 3 and 5 are in substantially horizonal alinement. The casing 1 at its outer or right hand end projects into a suitable vertical partition wall 10 and the outer end portion of the casing has an inner wall 11 which merges with a portion 12 of the outer wall of the casing to form a substantially cylindrical section having a cylindrical chamber 13 and this outer portion is threaded at its outer end at 14. Adjacent the threaded portion an internal cylindrical flange 15 is formed in this outer section.

A chamber 16 is formed at the inner or left hand end of the casing between the casing wall 17 and an inner wall 18. The inlet 4, as shown in Fig. 3, opens into this chamber 16, and a port 19 is formed in the inner wall 18 in axial alinement with the threaded portion 14 of the outer section.

A cylindrical hollow valve body 20 is provided at its outer end with an external cylindrical flange 21 to cooperate with the internal cylindrical flange 15 and a suitable gasket is placed between these flanges. At its inner end the valve body is provided with an external cylindrical flange 22 to cooperate with the internal flange 18 and a suitable gasket is placed between these flanges. At this end the valve body is provided with a seat 23 to cooperate with the port 19. The valve body is also provided intermediate its length with an external flange 24 to cooperate with the inner end of the chambered outer section of the casing, and a suitable gasket is placed between the inner end of this section and the flange 24.

The chamber 13 surrounding the valve body in the outer section extends at 25 toward the inner end of the casing between an inner wall 26 and the outer wall of the casing and contains the inlet 2 for the pipe 3.

A large chamber 27 at the inner end of the casing contains the outlet 8 and is provided with a port 28 connected with the outlet 6. This chamber surrounds the inner end of the valve body between the flange 18 and intermediate contacting flanges 29 on the valve body and 30 on the casing.

A fourth chamber 31 surrounds the valve body between the flanges 29, 30, and the flange against which the flange 24 of the valve body seats and this chamber opens into the chamber 27 through a discharge chute 32 extending from the valve body directly toward the port 28 forming the outlet from the pipe 7 into the chamber 27, this chute being formed by an extension 33 of the flange 30 and an extension 34 of the inner wall 11.

A generally cylindrical valve is fitted within the valve body and has a stem 35 extending through and threaded at 36 centrally in a plug 37 engaging the threaded end 14 of the outer section of the casing. A suitable packing gland 38 in the plug 37 is held in place around the valve stem by a hollow threaded nut 39. A cover plate 40 of suitable design and shape fits over the valve stem 35 and is held, by a sleeve 41 having a driving fit in the nut 39, against the partition wall 10, thus concealing the end of the valve casing. A suitable handle 42 is mounted on the end of the stem and provided with a pointer 43 to indicate the position of the valves.

The valve when in its innermost or closed position, as shown in the drawings, seats at its inner end against and closes the valve seat 23 and consequently the port 19. At the same time the hollow valve body is closed at the intermediate flange 24 by a valve seat 44 held in place by a sleeve 45 threaded to an enlarged section of the valve stem.

Ports 46 open through the valve body into the chamber 13, and ports 47 and 48 open through the valve body into the chamber 31 at opposite sides of a flange 49 on the valve having a sliding fit in the valve body.

A diverter valve is mounted in the casing beneath the main valve and is provided with a stem 50 extending through the casing and through the cover plate 40. At its inner end this valve is provided with a head 51 to fit the port 28 when the valve is moved inward or to the left. When this valve is in open position the head stands in line with the outer wall of the chute 32 and thus acts to assist in directing the discharge through the chute 32 into and through the port 28 and the outlet 6. This valve is normally held in open position, as shown in the drawings, by a spring 52 extending into a head 53 connected to the stem which head telescopes in a hollow nut 54 threaded into a plug 55 in turn threaded into the casing and holding in place the packing gland 56.

The operation of the construction thus described will now be apparent. With the valve in the closed position illustrated the hot water entering through the pipe 5 is maintained in the chamber 16 by the main valve closing the port 19 and the cold water entering through the pipe 3 is maintained in the chamber 25, 13 by the main valve closing the port formed on the flange 24 of the valve body. When the main valve is rotated it slides to the right, due to its threaded engagement at 36 in the plug 37, and these two ports gradually open and the flow of hot water from the chamber 16 enters the chamber 31 through the ports 47 and the cold water from the chamber 13 enters this chamber 31 through the ports 48. As the valve moves from closed position the flow from the chamber 16 gradually increases and that from the chamber 13 gradually decreases and when the valve moves in the opposite direction the reverse action occurs so that by turning the valve a mixture may be obtained of any desired temperature intermediate the temperatures of the water admitted at the two inlets. The discharge of the mixture takes place from this chamber 31 through the chute 32 and is directed with all the force of the pressure on the water out through the port 28 and the outlet pipe 4. The action is somewhat similar to that of an injector and prevents discharge of the mixture through the opposite outlet. Particularly when the pipe 7 extends vertically downward and the pipe 9 vertically upward a substantial vacuum is formed in the pipe 9. When it is desired to divert the flow of the mixture through the pipe 9 the diverter valve is pressed inward against the force of the spring 52 until it closes the port 28 when the pressure of the water against the back or right hand side of the head 51 together with the discharge through the chute 32 against the head acts to hold the valve firmly seated and thus the entire flow passes out through the pipe 9.

Having thus described the invention, what is claimed as new, and desired to be secured by Letters Patent, is:

1. A mixing valve construction for fluids under pressure having different temperatures including a casing having two inlets one for each fluid and two outlets through either of which a mixture of the two fluids of desired intermediate temperature may be discharged comprising a chamber within the casing containing the two outlets, a discharge chute extending within the chamber toward one of the outlets, a mixing valve within the casing operable exteriorly of the casing and acting when in closed position to close the flow from both inlets to said chamber and when moved gradually to increase the flow through the one inlet and decrease the flow through the other inlet and discharge the resulting mixture through said chute, a diverting valve within the chamber normally held in open position and acting when moved to closed position to close the said outlet toward which the chute opens and be held in closed position by the pressure of the fluid in the chamber and effect the discharge of the mixture through the other outlet.

2. A mixing valve construction as and for the purpose described in claim 1, in which the head of the diverting valve when in open position is located adjacent to the wall of the chute to form an extension thereof and assist in directing the discharge of the mixture through the first outlet.

3. A mixing valve construction for fluids under pressure having different temperatures and for discharging a mixture of desired intermediate temperature through either of two outlets comprising a casing having at the outer end portion an inner wall which merges with a portion of the outer wall to form a chambered cylindrical section threaded at its outer end and having adjacent the threaded portion an internal cylindrical flange, a chamber at the inner end of the casing between the casing wall and an inner wall having a port in axial alinement with said threaded section and an inlet to the chamber for one of the fluids, a hollow valve body having at its outer end an external cylindrical flange to cooperate with the said internal flange and at its inner end a seat to cooperate with the aforesaid port and an intermediate external flange to cooperate with the inner end of the aforeside section, a plug threaded into said section acting to hold the valve body in seated position, a second chamber surrounding the valve body at its outer portion and containing a second inlet, a third chamber containing both outlets, a fourth chamber surrounding the valve body and opening into the third chamber through a discharge chute extending from the valve body toward one of the outlets, ports opening through the valve body into the second chamber, ports opening through the valve body into the fourth chamber, a cylindrical valve fitting within the valve body having a stem extending through and threaded to the plug and acting when in its innermost position to close the port at the inner end of the valve body and the ports opening into the second chamber and when moved from said position gradually to increase the flow from the first chamber and decrease the flow from the second chamber through the ports opening into the fourth chamber, a port in the casing at the outlet facing the chute, and a valve mounted in the casing having a stem extending through the casing wall and yieldingly held in open position with its head adjacent the outer wall of the chute and acting when pressed inward to close the outlet port facing the chute and be held in closed position by the pressure of the fluid in the third chamber.

PAUL C. SYMMONS.

REFERENCES CITED

The following references are of record in the file of this patent:

UNITED STATES PATENTS

| Number    | Name     | Date           |
|-----------|----------|----------------|
| 1,345,934 | Knox     | July 6, 1920   |
| 1,508,938 | Powers   | Sept. 16, 1924 |
| 1,878,097 | Bletcher | Sept. 20, 1932 |
| 1,937,246 | Reedy    | Nov. 28, 1933  |
| 2,250,815 | Egg      | July 29, 1941  |
| 2,308,127 | Symmons  | Jan. 12, 1943  |